United States Patent Office 3,558,311
Patented Jan. 26, 1971

3,558,311
PHOTOGRAPHIC MATERIAL COMPRISING LIGHT-SENSITIVE POLYMERS AND PHOTODEGRADATION PROCESS
Gérard Albert Delzenne, 's Gravenwezel, and Urbain Leopold Laridon, Wilrijk, Belgium, assignors to Gevaert-Agfa N.V., Mortsel, Belgium, a Belgian company
No Drawing. Filed July 11, 1968, Ser. No. 743,947
Claims priority, application Great Britain, Aug. 8, 1967, 36,393/67
Int. Cl. G03c 1/68
U.S. Cl. 96—36.3
6 Claims

ABSTRACT OF THE DISCLOSURE

Light-sensitive materials comprising a polymer containing oxime ester groups and photographic processes comprising photodegradation of the polymer.

---

The present invention relates to light-sensitive polymers, to degradation on exposure to actinic light rays of these light-sensitive polymers and to the use of this photodegradation in the manufacture of positive photographic printing plates and etching resists.

According to the invention light-sensitive polymers are provided which are characterised in that the polymer chains have attached thereto side-substituents containing an oxime ester group or that oxime ester groups form integral parts of the polymer chain.

Light-sensitive polymers having side-substituents comprising an oxime ester group can be obtained through reaction of monoximes with acrylyl or methacrylyl chlorides and polymerisation or copolymerisation of the formed monomer carrying an oxime ester group. For example after having allowed to react methacrylyl chloride with diacetylmonoxime in the dark, the monomer formed may be polymerised by using azodiisobutyronitrile as catalyst. In order to prevent the oxime ester group from being destroyed the temperature of polymerisation is kept below 60° C.

The polymers comprising oxime ester groups as integral part of the main polymeric chains are preferably of the polycondensation type. They can, e.g. be produced by polycondensation of p-hydroxyphenylglyoxal-aldoxime or 1(p-hydroxyphenyl)-1,2-propanedione-2-oxime with a dicarboxylic acid chloride, with a mixture of at least two dicarboxylic acid chlorides, or with a mixture of at least one dicarboxylic acid chloride and at least one diamine. In these reactions other dihydroxy compounds may be included such as dihydroxyarylalkanes.

Very convenient are the polyesters obtained by polycondensation of the above oximes with a mixture of terephthalic acid chloride and isophthalic acid chloride, wherein also a certain amount of 2,2-bis(4-hydroxyphenyl)-propane or its homologues may be included in the polycondensation reaction.

Especially convenient are the polyesters obtained by polycondensation of the above oximes with a mixture of isophthaloyl chloride and sebacoyl chloride, wherein also a certain amount of 2,2-bis(4-hydroxyphenyl)-propane may be included in the polycondensation reaction.

Preferably the polycondensation reaction is carried out at room temperature according to a two-phase reaction method. The compounds containing oxime groups are dissolved in water, to which an amount of alkali hydroxide has been added. The dicarboxylic acid chloride(s) is (are) dissolved in a halogenated hydrocarbon such as methylene chloride and the two immiscible solutions are vigourously stirred, together with a solution of a suitable catalyst.

When using the expression "polymers containing oxime ester groups" hereinafter, polymers are meant wherein the oxime ester groups are present in side-substituents distributed along the polymer chains, as well as polymers wherein the oxime ester groups form integral parts of the main polymer chains.

On exposure to light rays having wavelengths ranging from 2500 to 4000 angstroms, the oxime ester groups in the polymer either belonging to side-substituents or occurring as integral parts of the main polymeric chains, are decomposed, resulting in a degradation of the original polymeric material. The solubility characteristics of the polymer fragments of lower molecular weights produced are modified in an appreciable manner when compared to those of the original polymer. These polymer degradation products can easily be washed away with solvents or solvent mixtures, in which the original polymer is insoluble. This difference in solubility between the original polymer containing oxime ester groups and its photodegradation products makes it possible to use the polymers containing oxime ester groups in the manufacture of positive photographic printing plates and etching resists. A base or support may be coated with a solution of the polymer or polymers containing oxime ester groups, whereafter the solvent or solvent mixture is eliminated by known means such as evaporation, leaving a more or less thin coating of the polymer containing oxime ester groups on the base or support. Thereafter the dried coating is exposed to actinic light.

The intermediate fragments obtained during the photodegradation of polymers containing oxime ester groups can also be used to initiate the photopolymerisation of ethylenically unsaturated monomeric materials. Indeed, when the exposure to actinic light rays of the polymers containing oxime ester groups occurs in the presence of ethylenically unsaturated monomeric materials, the intermediate fragments obtained during the photodecomposition intiate the photopolymerisation of the unsaturated monomers and graft or block copolymers are formed. This matter has been described in our copending application Ser. No. 743,948 filed on even date and relating to the photopolymerisation of ethylenically unsaturated organic compounds.

According to the first procedure described above, wherein no ethylenically unsaturated monomeric materials are present, the light-sensitive coating comprises polymers containing oxime ester groups. This coating may also comprise minor amounts of additives, which increase the light-sensitivity of the compounds containing oxime ester groups, provided no ethylenically unsaturated monomeric materials are present in the light-sensitive coating composition.

Further, the light-sensitive coating may also comprise stabilizers, plasticizers, extenders, dyes and the like. The term "light-sensitive composition" in this description is to be understood to mean a composition comprising the light-sensitive polymers containing oxime ester groups, and which may also include other additives.

In order to prepare a copying material in accordance with the invention, a support is coated with a solution in an organic solvent or in a mixture of organic solvents of the polymers containing oxime ester groups. Metal supports, or supports coated with metals such as e.g. zinc, and especially aluminium, are excellently suited as support materials for a printing plate. It is not strictly necessary to subject the metal supports to be used to any preliminary chemical treatment in order to render their surfaces suitable for accepting the light-sensitive layer. A simple mechanical roughening of the metallic surface proves to be quite sufficient for the application of the light-sensitive layer, which firmly attaches itself to the metallic base in the form of a thin uniform film. For the production of planographic printing plates there can also be used, e.g., plates of stone or glass and also specially treated sheets of paper or plastic foils.

The base or support is coated by whirlcoating, brushing or spraying with a solution of the light-sensitive composition in a suitable solvent, or may be coated continuously on known coating machines, whereupon the solvent or solvent mixture is eliminated by known means such as evaporation, thus leaving a more or less thin coating of the light-sensitive composition upon the base or support. The thickness of the light-sensitive layer obtained may be from about 0.5 to $20\mu$ and is preferably between 1 and $5\mu$. The light-sensitive coating is then ready for being exposed to actinic light rays. The light source should preferably furnish an effective amount of ultraviolet radiation. Suitable sources of light include carbon arcs, xenon lamps, mercury vapour lamps, fluorescent lamps, argon glow lamps, photographic flood lamps, and tungsten lamps.

The light-sensitive layer is exposed to actinic light through a contacted transparent master pattern consisting solely of opaque and transparent areas, e.g. the so-called line or half-tone positive or negative wherein the opaque areas are of the same optical density. However, it is also possible to expose the light-sensitive layer to a projected image. During exposure, the light induces the photolytic transformation of the oxime ester groups, resulting in a degradation of the polymeric material.

The development or removal of the coating in the exposed areas can be effected by means of a solvent or a mixture of solvents wherein the photodegradation products are soluble, but wherein the original polymeric material is insoluble. Accordingly, the unexposed parts of the layer remain to form a positive image of the master pattern. These positive images can be used as printing plates, such as for planographic and offset printing. They may also be subjected to an etching process, which makes them suitable for intaglio or relief printing.

In order to prepare a printing form for gravure printing an exposure and etching technique is used wherein in the base material cells can be formed according to a screen pattern for receiving the printing ink.

Base materials suited for etching are well known. More particularly base materials that substantially consist of zinc, copper, steel, or an etchable magnesium alloy can be used.

In order to prepare a planographic printing plate a base material is chosen suited for lithographic printing, preferably a zinc sheet.

A special advantage of the use of the polymers comprising oxime ester groups according to the invention is the easy way in which the light-sensitive groups can be introduced into the polymer chains. A further advantage of the present light-sensitive compositions is that they can be prepared a considerable time before use.

The following examples illustrate the invention.

EXAMPLE 1

A solution of 15 g. of p-hydroxypropiophenone in 70 cc. of dry ether was prepared in a flask of 250 cc. equipped with a stirrer, a gas inlet and a reflux condenser. Dry hydrogen chloride gas was conducted through the solution at a rate of 2–3 bubbles/sec., while 11.5 cc. of butyl nitrite was added dropwise through the condenser in 30 minutes. Then the mixture was cooled in ice-water and hydrogen chloride was allowed to bubble for 10 minutes through it. The reaction mixture was allowed to stand overnight in the refrigerator. Then it was shaken twice with cold water. Subsequently the ether solution was extracted with 300 cc. ice-cold 5% aqueous solution of sodium hydroxide. This solution was poured into a mixture of 100 cc. of ice and 50 cc. of concentrated hydrochloric acid whilst stirring. The precipitate formed was separated, dried, and purified by a treatment with benzene at reflux temperature. The insoluble fraction was recrystallized from water. Yield: 12 g. of 1(p-hydroxyphenyl)-1,2-propanedione-2-oxime according to the formula:

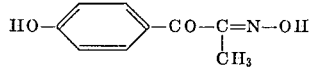

In a flask of 250 cc. provided with a stirrer and a dropping funnel 2.28 g. of 2,2-bis(4-hydroxyphenyl)-propane (0.01 mole), 1.79 g. of 1-(p-hydroxyphenyl)-1,2-propanedione-2-oxime (0.01 mole) and 0.1 g. of triphenylmethylarsonium iodide as a polycondensation catalyst were dissolved in a mixture of 37.6 cc. of 1.065 N sodium hydroxide and 10 cc. of methylene chloride.

The resulting mixture was cooled in ice-water. A solution of 2.03 g. of isophthaloyl chloride (0.01 mole) and 2.03 g. of terephthaloylchloride (0.01 mole) in 15 cc. of methylene chloride was added dropwise to the mixture whilst stirring. This new mixture was then stirred for further 15 min. and then diluted with methylene chloride. The polymer was precipitated by adding methanol. Yield 6 g. of a copolyester containing equal amounts of recurring units of the following formulae:

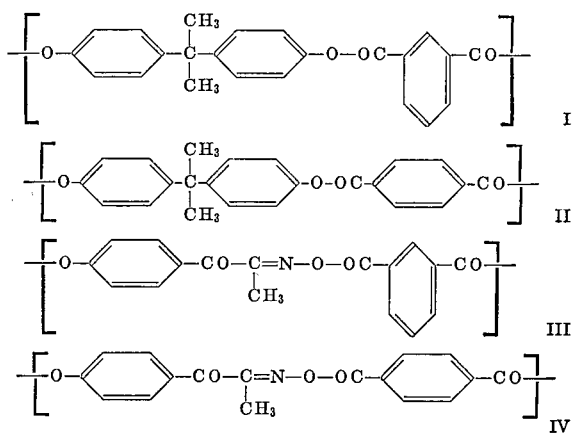

A solution containing 50 mg. of the thus formed copolyester and 1 mg. of crystal violet in 2 ml. of methylene chloride and 1 ml. of trichloroethane was applied to an aluminium foil. Before drying, the thickness of the layer was 0.075 mm. The layer was kept in the dark till complete evaporation of the solvent.

The polymer formed a strongly adhering film layer on the aluminium support. A part of this layer was then exposed through a diapositive test image to a lamp of 80 watt Hg HP placed at a distance of 15 cm. After an exposure of 15 min. the exposed areas of the layer become soluble in methyl cellosolve, which initially was a precipitating agent for the polycondensate. A positive image was obtained from the original.

EXAMPLE 2

In a 1 litre flask equipped with a stirrer and a condenser 66.8 of selenium oxide was dissolved in a mixture of 360 cc. of dioxan and 12 cc. of water by heating at 60° C. To this solution 81.6 g. of p-hydroxyacetophenone were added and the mixture was heated for 6 hrs. at 100° C. After one night the precipitated selenium was filtered with suction and the solution was evaporated under reduced pressure at 40° C. The residue was treated with 450 cc. of water on an oil-bath at 100° C.

Then, animal charcoal was added and the mixture was stirred and heated at reflux temperature. After standing overnight, the mixture was heated again to 100° C., filtered, and concentrated at 40° C. The precipitated yellow product was collected and dried. Yield: 58 g. of p-hydroxyphenyl-glyoxal hydrate according to the formula:

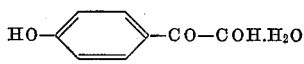

All of the p-hydroxyphenyl-glyoxal hydrate was dissolved in 400 cc. of ethanol. To the solution obtained a solution of 24.5 g. of hydroxylamine hydrochloride in 50 cc. of water was added. The mixture was cooled in ice-water and a solution of 30 g. of sodium hydroxide in 150 cc. of water was added gradually. After keeping of the mixture in a refrigerator for 24 hrs., the precipitate formed was filtered with suction, washed with 100 cc. of water, and dissolved in a solution of 16 g. of sodium hydroxide in 200 cc. of water. After cooling, the mixture was acidified by the addition of 80 cc. of concentrated hydrochloric acid. The precipitate formed was filtered with suction, washed with a small quantity of water, and recrystallized from water. Yield: 22 g. of p-hydroxyphenyl-glyoxal aldoxime having the formula:

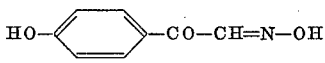

By polycondensing this product with a mixture of isophthaloyl chloride and terephthaloyl chloride according to the method described in Example 1, there were obtained copolyesters consisting of equal amounts of recurring units of the formulae:

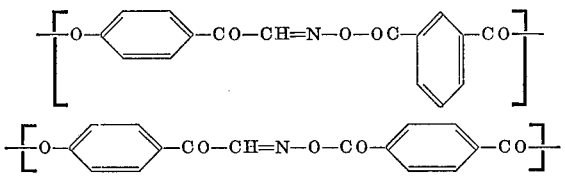

An amount of 0.1 g. of the above-mentioned copolyester and 2 mg. of Crystal Violet are dissolved in 2 cc. of methylene chloride and 2 cc. of trichloroethane. The solution formed was then applied to an aluminum foil so that before drying a layer of 0.075 mm. in thickness was obtained. After having been dried the resulting material was exposed to a diapositive by means of an 80 watt mercury vapour lamp placed at a distance of 15 cm. After an exposure of 15 minutes the exposed areas were washed away with methyl Cellosolve. A positive image obtained.

EXAMPLE 3

(A) Preparation of 2,3-butanedione-O-methacrylyl-oxime

An amount of 20 g. of diacetylmonoxime (0.2 mole), 100 ml. of methylene chloride, and 16 ml. of pyridine were placed in a three-necked flask of 500 ml. provided with a stirrer and a dropping funnel.

Whilst stirring and cooling in ice-water 19 ml. of methacryloyl chloride (0.2 mole) were added dropwise in 15 minutes. Stirring was continued for 60 minutes at 40° C. After cooling, the solution was shaken twice with 100 ml. of water and dried on anhydrous sodium sulphate. The solution was inspissated under reduced pressure and subsequently heated to 50° C. Yield: 22 g. of 2,3-butanedione-O-methacrylyloxime according to the formula:

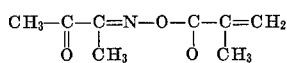

(B) Copolymerisation of methyl methacrylate and 2,3-butanedione-O-methacrylyloxime An amount of 5 ml. of acetone, 5 ml. of methyl methacrylate, 1 g. of 2,3-butanedione-O-methacrylyloxime, and 0.05 g. of azodiisobutyronitrile were placed in a 25 ml. pressure tube. Nitrogen was then allowed to bubble through this solution for 15 minutes. Subsequently the tube was sealed.

The mixture was heated for 16 hours at 60° C. The viscous solution was then diluted with 25 ml. of acetone, whereupon the solution was poured out in 0.5 ml. of ether. The resulting product was purified by dissolving in 50 ml. of acetone and pouring out in 0.5 ml. of ether. The grainy polymer was dried under reduced pressure. Yield: 4.5 g. of a copolymer composed of recurring units according to the formulae:

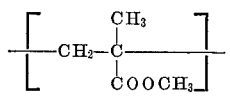

and

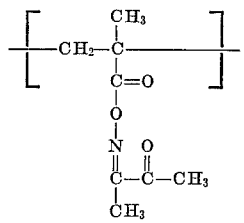

These recurring units are present in the copolymers in a proportion of 13 units of the first formula to one unit of the second formula.

When 5 ml. of methylmethacrylate were allowed to react with 2 g. of 2,3-butanedione-O-methacrylyloxime, a copolymer was obtained, which was composed of the above-mentioned recurring units in a proportion of 5.5 units of the first formula to one unit of the second formula. When using 5 ml. of methylmethacrylate and 3 g. of the oxime compound the copolymer comprised 2.5 units of the first formula for each unit of the second formula.

(C) Exposure

A quantity of 2 g. of the above-mentioned copolymer was dissolved in benzene. The volume was then adapted to form a 2% by weight solution. The resulting solution was exposed to a high pressure mercury vapour lamp of 300 watt placed at a distance of 18 cm. The decrease of viscosity represented in the table below, point to a degradation of the polymer chains. The measurement of the viscosity was executed with a solution in benzene at 25° C.

Initial viscosity (specific viscosity) ($\eta_{sp}$) _____ 0.86
After 30 minutes _____ 0.37
After 60 minutes _____ 0.2
After 90 minutes _____ 0.14

EXAMPLE 4

In a flask of 250 cc. provided with a stirrer and a dropping funnel 2.28 g. of 2,2-bis(4-hydroxyphenyl)-propane (0.01 mole), 0.895 g. of 1-(p-hydroxyphenyl)-1,2-propanedione 2-oxime (0.005 mole) and 0.05 g. of triphenylmethylarsonium iodide as a polycondensation catalyst were dissolved in a mixture of 30 cc. of 1 N aqueous sodium hydroxide and 10 cc. of methylene chloride. The resulting mixture was cooled in ice-water. A solution of 2.03 g. of isophthaloyl chloride (0.01 mole) and 1.2 g. of sebacoyl chloride (0.005 mole) in 10 cc. of methylene chloride was added dropwise to the mixture whilst stirring. This new mixture was then stirred for further 30 min. and then diluted with methylene chloride. The polymer was precipitated by adding methanol. Yield: 5 g. of a copolymer containing the following recurring units randomly distributed over the polymer chain:

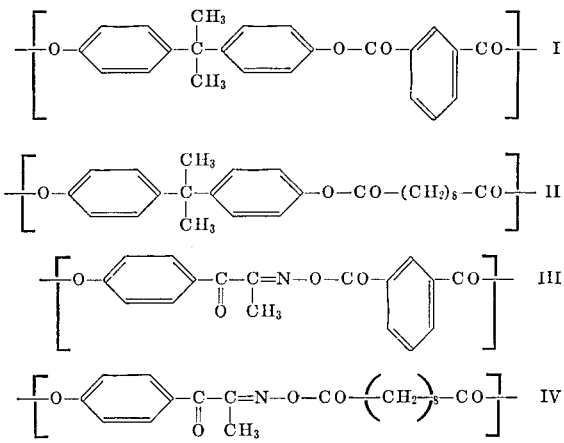

The proportions of recurring units I:II:III:IV were as follows 4:2:2:1.

A solution containing 50 mg. of the thus formed copolyester, and 2 mg. of crystal violet in 2 ml. of methylene chloride and 1 mole of trichloroethane was applied to an aluminum foil. Before drying, the thickness of the layer amounted to 0.075 mm. The layer was kept in the dark till complete evaporation of the solvent. The polymer formed a strongly adherent film layer on the aluminum support. A part of this layer was then exposed through a diapositive test image to a 80 watt mercury vapour lamp placed at a distance of 15 cm. After an exposure of 15 min. the exposed areas of the layer became soluble in a mixture of ethylene glycol monomethyl ether and tetrachloroethane (3/1) which initially was a precipitating agent for the polycondensate. A positive image of the original was obtained.

We claim:

1. Copying material for use in the photochemical preparation of printing plates which comprises a support carrying a light-sensitive coating comprising a light-sensitive polymer characterized in that the polymer chain has attached thereto side-substituents containing an oxime ester group or that oxime ester groups form integral parts of the polymer chain in the absence of any ethylenically unsaturated monomeric material.

2. Copying material according to claim 1, wherein the polymer with side-substituents comprising an oxime ester group is a copolymer of methyl methacrylate and 2,3-butanedione-O-methacrylyloxime.

3. Copying material according to claim 1, wherein the polymer having oxime ester groups as integral parts of the polymer chain is a copolyester of isophthalic acid, terephthalic acid, and 1(p-hydroxyphenyl)-1,2-propanedione-2-oxime.

4. Copying material according to claim 1, wherein the polymer having oxime ester groups as integral parts of the polymer chain is a copolyester of isophthalic acid, terephthalic acid, 1(p-hydroxyphenyl)-1,2-propanedione-2-oxime, and 2,2-bis(4-hydroxyphenyl)-propane.

5. Copying material according to claim 1, wherein the polymer having oxime ester groups as integral parts of the polymer chain is a copolyester of isophthalic acid, sebacic acid, 1-(p-hydroxyphenyl)-1,2-propanedione-2-oxime and 2,2-bis(4-hydroxyphenyl)-propane.

6. Process for the photochemical preparation of a printing plate, which comprises exposing a copying material as stated in claim 1 through a master pattern to actinic light whereby in the exposed areas the light-sensitive polymer is degraded and developing the resulting positive image of the master pattern by dissolving away the exposed portions of the coating in a solvent for the photodegradation products.

References Cited
UNITED STATES PATENTS

| | | | |
|---|---|---|---|
| 3,074,869 | 1/1963 | Workman | 96—35.1X |
| 3,203,802 | 8/1965 | Burg | 96—115X |
| 3,279,919 | 10/1966 | Laridon et al. | 96—35.1 |
| 3,342,593 | 9/1967 | Burg | 96—35.1X |

FOREIGN PATENTS

| | | | |
|---|---|---|---|
| 1,099,166 | 2/1961 | Germany | 96—115 |

RONALD H. SMITH, Primary Examiner

U.S. Cl. X.R.

96—115, 35.1